March 30, 1971     V. C. REES     3,573,016

METHOD AND APPARATUS FOR FORMING FIBERS

Filed July 24, 1968     2 Sheets-Sheet 1

INVENTOR.
VERNON C. REES
BY
*Staelin & Overman*
ATTORNEYS

# United States Patent Office 3,573,016
Patented Mar. 30, 1971

3,573,016
METHOD AND APPARATUS FOR FORMING FIBERS
Vernon C. Rees, Newark, Ohio, assignor to Owens-Corning Fiberglas Corporation
Filed July 24, 1968, Ser. No. 747,141
Int. Cl. C03b *37/00*
U.S. Cl. 65—2   11 Claims

ABSTRACT OF THE DISCLOSURE

Method and apparatus for forming fibers in heat-softenable material which includes means for continuously melting material to form a molten pool of the material and fiber-forming means connected to receive molten material from the pool. Means are used to heat the fiber-forming means. The level of the molten pool is sensed. Control means responsive to the level sensing is utilized to regulate the amount of heat supplied to the fiber-forming means.

---

Figure 1:
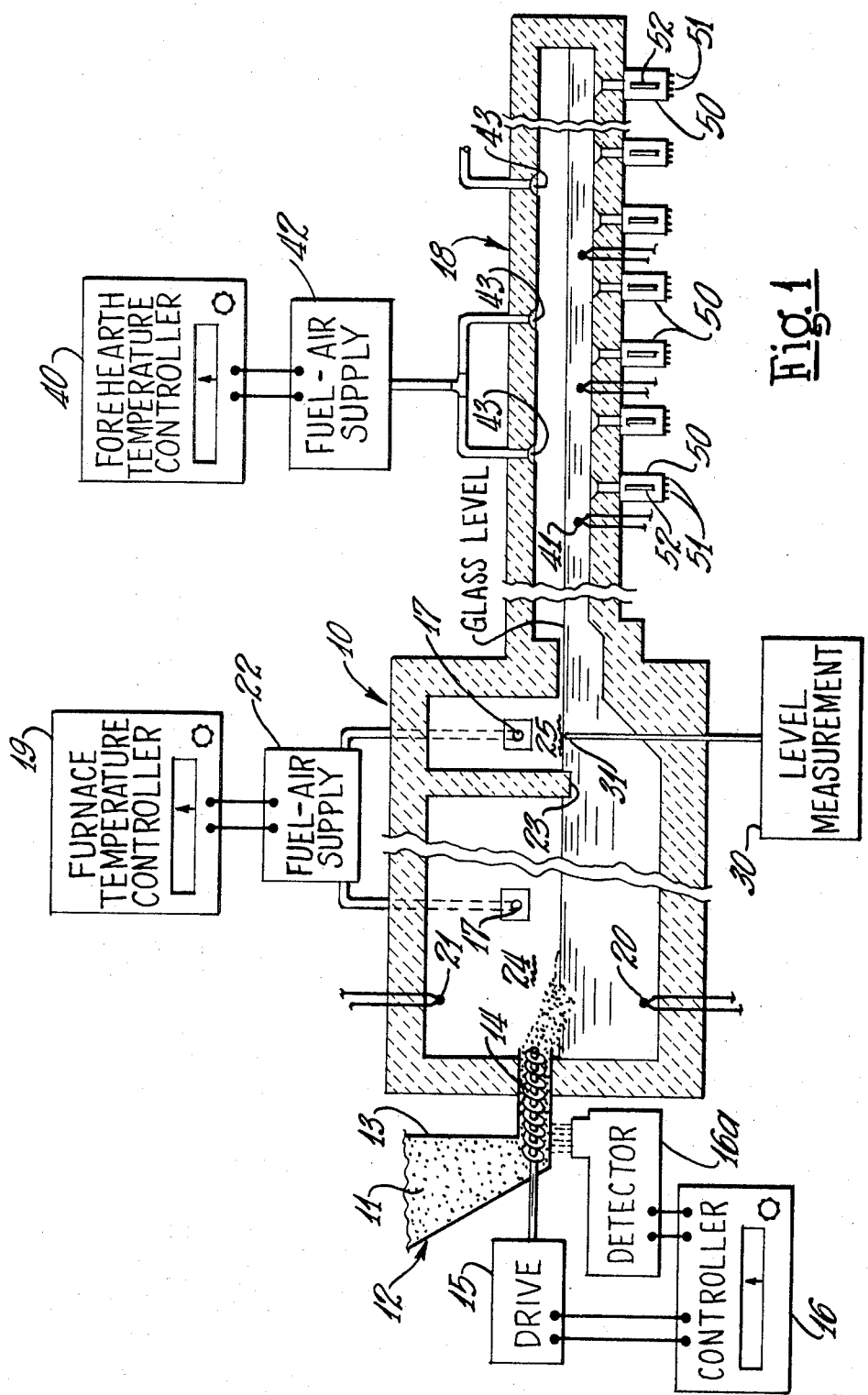

In the manufacture of mineral fibers and especially those formed of glass which are collected and processed to form mats or like constructions particularly usable for heat and sound insulation or kindred purposes, streams of molten glass flowing from a supply are acted upon or engaged by blasts of steam or compressed air or other gases to draw or attenuate the streams to fibers. The formed fibers are usually collected or accumulated upon a moving foraminous conveyor to a thickness to form mats of desired dimensions and chaarcteristics for particular purposes.

Most fiber making systems today are unsatisfactory in the area of maintaining optimum rates of flow of ma- material. Much progress has been made in the controlling of many of the variables in fiber making—especially in temperature, fuel and air flow, pressures, molten material levels, etc.

However, the feedback of information on the rate of material flow, such as glass, through the system has not been adequate. Checks are generally made only intermittently and usually are quite inaccurate. As a result, a continual variation of glass "pull" results and furnace operation, product quality, and job efficiency suffer.

In some present systems, for example, operator adjustments of the set points of bushing controllers determine the glass flow rate. To measure the flow rate, an operator must catch in a ladle a timed sample of glass as it flows out of the bushing. Weight of this sample is then a rate value. Accurate determinations by this method are quite difficult to make and, as they are not made frequently, there are long periods in which no information is available and the process drifts uncontrolled.

Accordingly, it is an object of this invention to provide a method and apparatus for achieving continuous and automatic control of fiber-forming material flow rate.

It is a further object of this invention to provide a method and apparatus for producing or forming fibers in a system which is adjustable by varying the bushing temperature to provide a "valve" action.

A still further object of this invention is to provide method and apparatus for achieving optimum glass flow rate through a fiber-forming system by providing a substantially constant batch input rate for forming a desired fiber and maintaining a constant fiber output by regulating bushing temperature in response to level variations of a molten pool of the material.

The above objects are carried out by apparatus for forming fibers from heat-softenable material which features means for melting the material, means for containing the molten material in a molten pool, means for supplying material to the melting means, feeder means connected to receive molten material from the pool, the feeder means having orifices formed therein for issuing streams of the molten material, and means for attenuating the streams into fibers. Means are provided for heating these feeder means to maintain the molten material in the feeder at a predetermined temperature. Means sense the temperature of the feeder means. Means are also utilized for sensing the level of the molten pool. Control means responsive to the temperature sensing means and the level sensing means is utilized for regulating the amount of heat supplied to the feeder means to assure a predetermined throughput in the feeder means.

The material supplying means advantageously delivers material to the melting means at a constant rate. The control means is operative to regulate the heat the feeder means to vary the viscosity of the molten material to provide a constant output from the feeder orifices whenever the batch material is supplied to the melting means at a constant rate. The feeder means may comprise one or a plurality of bushings.

The melting means may comprise a furnace having a melting tank which further includes forehearth means connected to the melting tank to supply the feeder means. The melting tank may be divided to form a melting chamber and a molten pool containing chamber. The dividing means may advantageously comprise a skimmer partition which isolates two combustion areas and provides an atmospheric seal therebetween. Such a dividing means may be used to dampen the level disrupting effects of material addition and melting in the melting chamber to reduce erroneous molten pool level readings in the molten pool chamber.

The control means may include means for establishing a setpoint operating temperature for each of the one or more feeders or bushings. Means are utilized to sense the actual temperature of the feeder means and provide a differential signal between the setpoint temperature and actual temperature. The control means may be made operative to change the setpoint operating temperature in response to the sensing of a level change by the level sensing means. Thus, when batch material is melted at a constant rate the level sensing means is operative to regulate the heat supplied to the bushing to provide a "valve" action which insures that the throughput of the bushings equals the input to the furnace.

The invention may then be regarded as a method and apparatus for producing fibers from heat-softenable material at a substantially constant rate, the constant rate which is chosen advantageously being the optimum operating condition for the furnace and bushing or feeder means combination.

In the specific embodiment illustrated herein gaseous blast means are utilized for attenuating the streams into fibers. The feeder means are electrically heated. The actual temperature of the feeder means is sensed by thermocouple means which generates a signal proportional to the temperature sensed. Means such as a controller is utilized for producing a signal proportional to a predetermined desired or setpoint temperature for the feeder means. The level sensing means may comprise apparatus which senses the level of the molten pool and generates a signal proportional thereto. A control means may then be utilized which is responsive to the three signals for regulating the amount of electrical current supplied to the feeder means.

Figure 2:
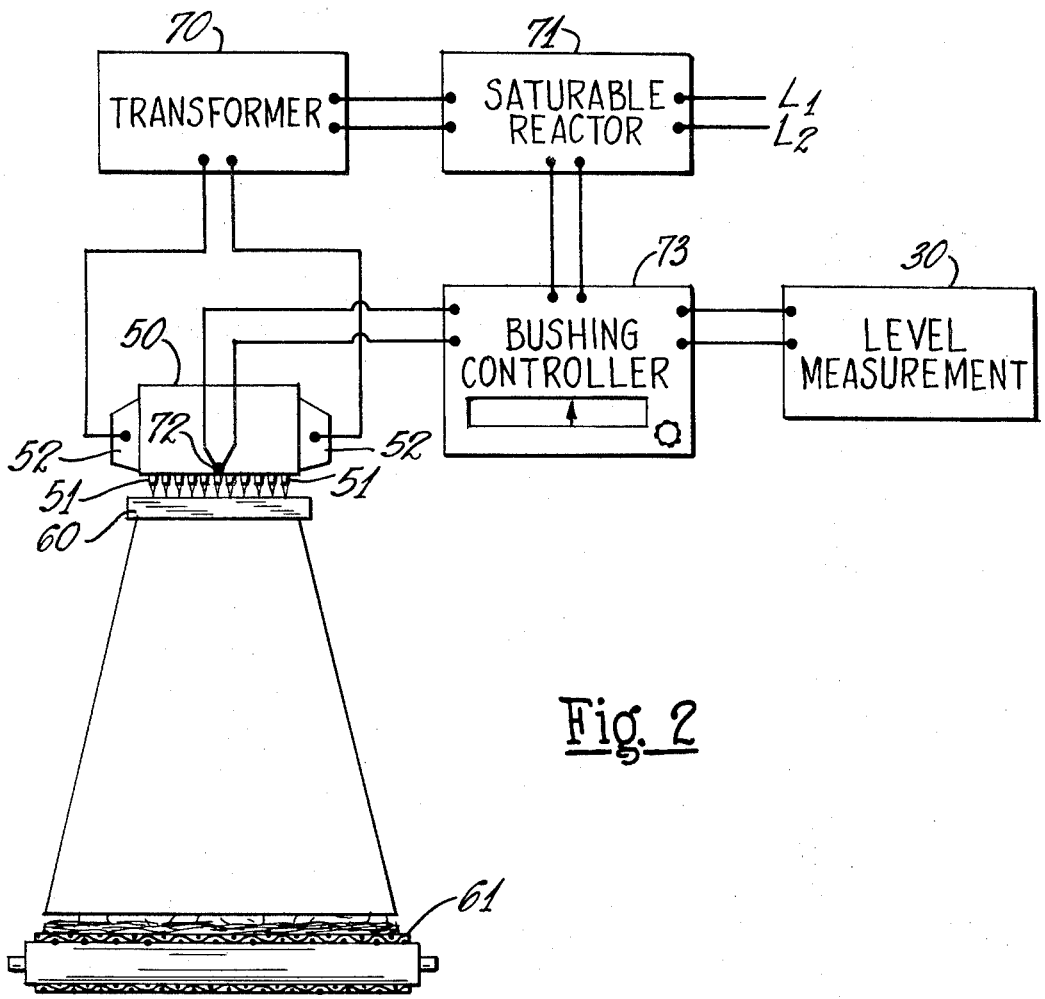

Other objects, advantages, and features of this invention will become apparent when the following description is taken in conjunction with the accompanying drawings, in which:

FIG. 1 is a semi-diagrammatic elevational view of an apparatus for producing fibers of mineral material embodying the present invention; and FIG. 2 is a schematic and diagrammatic illustration of an arrangement for controlling the production of fibers from the apparatus illustrated in FIG. 1.

A preferred arrangement for carrying out the method of the invention has been illustrated in connection with apparatus for producing blown fibers from mineral fiber-forming materials, but it is to be understood that the incorporation and use of the invention is contemplated with other methods and arrangements for producing fibers from heat-softenable materials wherever the same may be found to have utility.

The invention has been found to have particular adaptability with apparatus for producing blown fibers of glass sometimes referred to as glass wool, wherein blasts of steam or other gas are directed into engagement with streams of molten glass in a direction to draw out or attenuate the streams to fiber form by the velocity of the blasts. The fibers formed by this method are usable for many purposes: for forming mats for heat and sound insulation, both in bonded and unbonded forms; roofing materials; filter packs; protective coverings; and other kindred uses.

In FIG. 1 there is illustrated a furnace 10 constructed of refractory material which is adapted to receive glass batch or cullet 11 through a material delivery means generally indicated at 12. The material supplying means 12 may comprise a hopper 13 having a conveyor means 14 associated therewith to deliver the batch from the hopper to the furnace. The conveyor 14 may be of the auger type shown or of an endless belt variety. A drive means 15 is shown for driving the conveyor while a drive controller 16 may be utilized to set the speed of the conveyor drive to control the rate at which batch or cullet is fed to the furnace 10.

The furnace 10 may be fired by a plurality of fuel gas or oil burners 17 to a temperature rendering the glass batch or cullet molten and flowable. As indicated in FIG. 1 the raw batch material or cullet is introduced at the left side or rear end of an elongated furnace 10, the material in molten condition flowing forwardly or generally lengthwise of the furnace, and is mixed and fined as it flows through the furnace to and through a forehearth 18.

The melting and processing temperature within the furnace may be controlled by a furnace temperature controller 19 which may be responsive to a thermocouple 20 beneath the surface of the molten glass and/or a crown temperature thermocouple 21 mounted in the upper portion of the melting chamber of the furnace 10. In response to one or more temperature sensing means as described the furnace temperature controller 19 provides signals to a fuel-air supply means 22 to maintain a desired melting and refining temperature in the interior of the furnace 10.

A skimmer partition 23 may be built into the furnace to divide the furnace 10 into a melting chamber 24 and a molten pool chamber 25. While not necessary for the operation of this invention the use of a skimmer partition 23 is advantageous in that it not only blocks the flow of floating and unmelted batch or cullet 11, but in that it dampens and shields the disruptive effects of batch addition and melting in chamber 24 from the chamber 25 in which the level of the molten pool of glass may be sensed by a level measurement means 30.

The level measurement means 30 may be any of several suitable types such as a probe member which utilizes the electro-conductive properties of molten glass and in which the probe member and the melt are parts of a circuit which measures the level of the molten pool. In this embodiment there is illustrated a probe 31 which is utilized as a pneumatic indicator which operates when the probe member 31 has its open end covered by the molten material defining the level so as to create a back pressure within the member. Different levels or heads of molten material above the opening in the probe member 31 provide different pressures within the level measurement means 30 which may be converted to electrical signals which are proportional to the level of the molten pool within chamber 25 specifically, or within furnace 10 generally. Since such devices are well known to those skilled in the art a more detailed explanation will not be undertaken here.

The glass or other molten material in the forehearth 18 may be delivered from the forehearth to one or more feeder means or bushings 50, each bushing being provided with a single or a plurality of openings or orifices (see FIG. 2) formed in projecting tips 51 for flowing glass streams adapted to form primary filaments of bodies which are delivered to an attenuating means 60. As noted hereinbefore the attenuating means attenuates streams issuing from orifices in projecting tips 51 by gaseous blasts to form fibers in a known manner for deposition upon a collecting surface 61, which may be a foraminous conveyor, to form a mat or for other uses.

As noted hereinbefore with respect to the furnace 10, temperatures in the forehearth 18 may be maintained by a forehearth temperature controller 40 which is responsive to one or more thermocouples or other heat sensing means 41 located within the forehearth to supply a signal to a fuel-air supply controller means 42 which delivers a combustible mixture to burners 43.

Referring to FIG. 2 it may be seen that the heating current for an individual bushing of the plurality of feeder means 50 is alternating current supplied over a main power supply line by way of conductors L1 and L2. The power source, for example, may be a 440 volt, 60 cycle source (not shown). The alternating current is supplied to the feeder through a transformer 70 to terminals 52 connected to the bushing 50. The transformer 70 reduces the voltage, for example to a value in the order of 2 volts, which; since feeder 50 is made of low-resistance high-temperature metal such as platinum; is capable of providing heating current in the order of one or more kilo-amperes. The primary loop of the power circuit for the bushing 50 may contain a power regulator or controller such as a saturable core reactor 71 which acts as a variable impedance to permit adjustment of the current flow through the feeder for the temperature desired. Other suitable regulators, such as silicon controlled rectifiers may be used. The saturable core reactor is cooperatively associated with one or more thermocouples 72 attached to the side of the feeder 50 to sense and generate an electrical signal corresponding or proportional to the actual feeder temperature.

The thermocouple 72 may be connected to an amplifier contained in controller 73 which amplifies the temperature signal supplied from the thermocouple to the controller 73. The controller 73 may be set by an operator to a predetermined setpoint temperature which is based upon past history and experience in operating similar systems to provide a setpoint temperature which is believed to be desirable or within a desired range. The controller 73 may generate a signal proportional to the desired setpoint temperature for forwarding to the saturable reactor 71 or to be algebraically combined with the actual feeder temperature from themocouple 72 and/or the signal from the level measurement means 30.

The signal from the level measurement means 30 may advantageously be utilized to modify the setpoint in the controller 73 to provide a new setpoint directly as a result of the direct measurement of the level.

The controller 73 may include a regulator directly affected by the combination of the signals hereinbefore discussed to supply direct current to the saturable reactor 71 or other control device to modify the impedance offered by the reactor in the primary of the feeder power circuit to provide automatically a desired feeder temperature. When the temperature of the feeder tends to rise above the setpoint as modified by the level measurement means 30, the direct current supplied from the controller 73 to the saturable core reactor 71 is reduced, thereby enlarging the impedance offered by the reactor 71 and diminishing the current flow in the secondary or feeder loop connected to the terminals 52. If the temperature of the feeder tends to drop below the modified setpoint, the controller may act to supply additional direct current to the reactor 71, thereby reducing the reactor impedance and increasing the current flow in the secondary or feeder loop for a rise in temperature in the feeder 50. The feeder in this embodiment is thus maintained at a temperature which is determined by a preselected setpoint as modified to an operating setpoint by the level measurement means 30.

In the system of the present invention continuous and automatic control of glass flow rate is thus achieved. As pointed out above, glass flow rate is adjustable by the "valve" action of the bushing temperature. By the addition of means for precisely metering the flow of batch into the furnace there is provided a system capable of desired throughput control. As shown in the drawing and described hereinbefore continuous glass level information is available. Therefore, for a given batch input rate, glass flow out must be equal or a change in level will be indicated. It is only necessary then to use this indication for control of bushing temperature to maintain equilibrium between input and output.

A batch input control may be accomplished in a number of ways. As shown in FIG. 1 a detector, which may be a gamma ray source and detector, monitors mass flow of material via a conveyor, as indicated at 16a. The drive controller 16 may be manually set by an operator to provide a desired input, furnishing a control signal to conveyor drive 15. The drive controller 16 is responsive to signals received from the detector 16a to maintain the batch input at a predetermined constant rate, if a constant input and output system is desired to utilize the optimum flow rate conditions available for a furnace and bushing system.

There has thus been described apparatus for carrying out a method for controlling a fiber-forming system which comprises the steps of continually supplying molten material to a pool of such material, flowing streams of the material from feeder means receiving molten material from the pool, attenuating the streams into fibers, heating the feeder means, sensing the level of the molten pool, and regulating the amount of heat supplied to the feeder means in response to levels sensed in the pool. The regulating step may further include the steps of sensing the temperature of the feeder means to maintain the feeder means at a desired setpoint temperature and modifying the setpoint operating temperature as necessary in response to the level sensing step. The molten material may be supplied at a constant rate. Setpoint operating temperature may be increased in response to a rise in level and decreased in response to a drop in level.

The method may be described as an approach for producing fibers from heat-softenable material at a substantially constant rate which includes the steps of supplying and melting heat-softenable material at a constant rate, collecting the molten material in a pool, flowing streams of the material from a feeder means connected to the pool, attenuating the streams into fibers, sensing the level of the pool, heating the feeder means to maintain it at a desired temperature, and modifying the desired temperature in response to the level sensed in the pool.

It is apparent that, within the scope of the invention, modifications and different arrangements may be made other than is herein disclosed for the application shown and for other applications of the invention. The present disclosure is merely illustrative then, the invention comprehending all variations thereof.

I claim:

1. Apparatus for effecting feed forward control in forming glass fibers from heat-softenable material comprising means for melting said material, means for containing said molten material in a molten pool, means for supplying said material to be melted to said melting means at a constant rate, feeder means connected to receive molten material from said pool, said feeder means having at least one orifice formed therein for issuing a stream of said molten material, means for attenuating said stream into a fiber, means for heating said feeder means to a desired attenuation temperature range, means for sensing the temperature of said feeder means, means responsive to said temperature sensing means for regulating the amount of heat supplied to said feeder means to control the viscosity of said molten material in and thus the flow from said feeder means and means for sensing the level of said molten pool, said heat regulating means being further responsive to said level sensing means to increase the amount of heat applied to said feeder means when an increase in level is sensed and to decrease the amount of heat applied to said feeder means when a decrease in level is sensed.

2. Apparatus as defined in claim 1 in which said regulating means is responsive to said level sensing means to regulate the heat to said feeder means to vary the viscosity of said molten material to provide a constant output from said feeder orifice and thus provide a constant throughput for the entire apparatus.

3. Apparatus as defined in claim 1 in which said feeder means comprises a plurality of bushings.

4. Apparatus as defined in claim 1 in which said melting means comprises a furnace having a melting tank and which further includes forehearth means connected to said melting tank to supply said feeder means.

5. Apparatus as defined in claim 1 in which said melting means comprises a furnace having a melting tank and which further includes means for dividing said melting tank to form a melting chamber and said molten pool containing chamber.

6. Apparatus as defined in claim 5 in which said dividing means comprises a partition for damping the level disrupting effect of material addition and melting in said melting chamber.

7. Apparatus for forming fibers from heat-softenable material comprising means for supplying heat-softenable material at a constant rate, means for continuously melting said material to form a molten pool of said material, fiber-forming means connected to receive molten material from said pool, means for heating said fiber-forming means to heat said molten material to a desired fiber attenuating temperature, means for sensing the level of said molten pool, and control means responsive to said level sensing means for regulating the amount of heat supplied to said fiber forming means to increase and decrease the viscosity of said molten material in said fiber-forming means to maintain the pool level substantially constant.

8. Apparatus as defined in claim 7 in which said control means includes means for establishing a setpoint operating temperature for said feeder means, means for sensing actual temperature of said feeder means and providing a differential signal between setpoint temperature and actual temperature, said control means being operative to change said setpoint operating temperature in response to the sensing of a level change by said level sensing means.

9. Apparatus for producing fibers from heat-softenable material at a substantially constant rate comprising means for melting heat-softenable material to form a molten pool of such material, means for supplying heat-softenable material to said melting means at a constant rate, feeder means receiving molten material from said pool and having orifices formed therein for issuing streams of said molten material, gaseous blast means for attenuating said streams into fibers, means for electrically heating said feeder means, means for sensing the actual temperature of said feeder means and generating a signal proportional thereto, means for producing a signal proportional to a predetermined desired temperature for said feeder means, means for sensing the level of said pool and generating a signal proportional thereto, and control means responsive to said three signals for regulating the amount of electric heat supplied to said feeder means to increase and decrease the viscosity of said molten material to maintain the level of said pool substantially constant.

10. A method for feed-forward controlling a fiber-forming system comprising the steps of continuously supplying glass materials at a constant rate to a glass melter, forming a resultant molten pool of such material, flowing streams of said material from feeder means connected to said pool, attenuating said streams into fibers, heating said feeder means, sensing the level of said molten pool, and regulating the amount of heat supplied to said feeder means in response to levels sensed by said level sensing means to change the viscosity of said molten material in said feeder means to maintain the level of said pool substantially constant.

11. A method as defined in claim 10 in which said regulating step further includes the steps of sensing the temperature of said feeder means to maintain said feeder means at a desired setpoint operating temperature and modifying said setpoint operating temperature in response to levels sensed by said level sensing step.

References Cited

UNITED STATES PATENTS

| | | | |
|---|---|---|---|
| 3,246,124 | 4/1966 | Trethewey | 65—162X |
| 3,476,538 | 11/1969 | Trethewey | 65—29 |
| 3,482,956 | 12/1969 | Trethewey | 65—162X |

HOWARD R. CAINE, Primary Examiner

R. L. LINDSAY, JR., Assistant Examiner

U.S. Cl. X.R.

65—11, 29, 160, 162